Patented Nov. 21, 1944

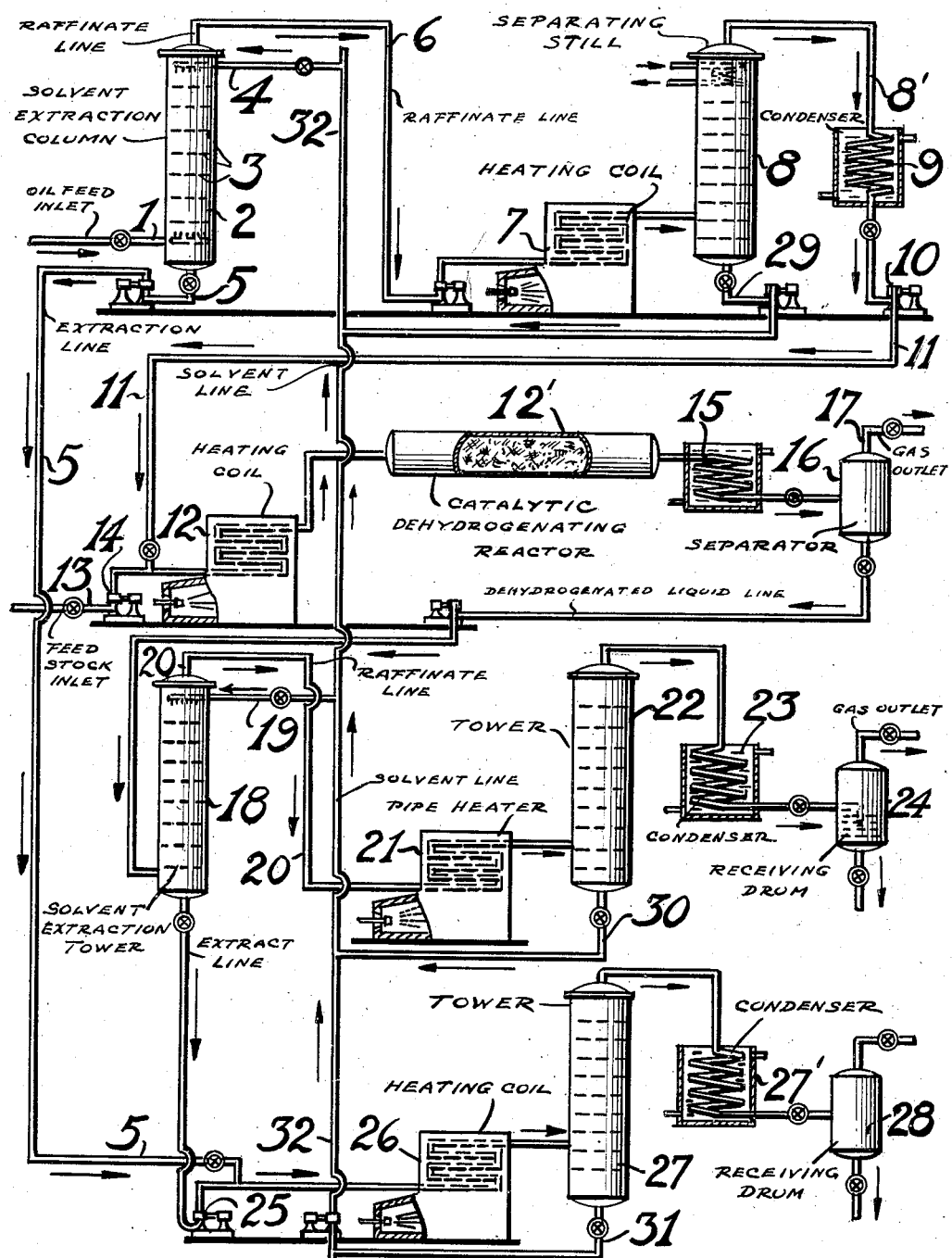

2,363,263

UNITED STATES PATENT OFFICE 2,363,263

ART OF PRODUCING VALUABLE AROMATIC HYDROCARBONS FROM PETROLEUM FRACTIONS

Raphael Rosen, Elizabeth, N. J., assignor to Standard Oil Development Company, a corporation of Delaware Application June 30, 1938, Serial No. 216,637

1 Claim. (Cl. 196—52)

The present invention relates to the art of producing valuable aromatic hydrocarbons from petroleum fractions, especially useful for blending with naphthas to make aviation and other type gasolines. The process will be fully understood from the following description.

The drawing is a diagrammatic view in sectional elevation of an apparatus for carrying out the present process.

In the drawing numeral 1 designates a feed line through which is supplied a naphtha or naphtha distillate of the type rich in naphthenic hydrocarbons. Such fractions are obtained from crudes found in various parts of the world, for example from certain Texas and California crudes, as well as those from Venezuela and other foreign countries. The naphtha distillate, by which is meant a fraction of the crude containing the naphtha or gasoline constituents, is passed into a solvent extraction apparatus 2. This apparatus is conveniently in the form of a column fitted with contact devices such as packing or bubble plates 3. The pipe 1 discharges into one end of the tower and into the opposite end a suitable solvent is discharged by pipe 4 so that the oil and solvent flow countercurrently to each other in the treating tower. If the solvent is heavier than the oil, then it will be introduced at the top of the column, as shown in the drawing, but in some instances lower specific gravity solvents are used and in such cases the flow will be reversed, the solvent added at the lower part of the column. From the following description it will be assumed that the solvent is of greater specific gravity and higher boiling range than the oil.

The extracted oil is withdrawn from the tower by pipe 5. This product is richer in aromatic fractions than is the feed, and the raffinate taken off by pipe 6 is largely saturated, containing both paraffinic and naphthenic fractions. Both extract and raffinate contain the solvent. The oil removed by pipe 6 is heated at 7 and discharged into a separating still 8, in which the oil is vaporized while the solvent is unvaporized. The oil vapor is removed by a pipe 8' and condensed at 9. The oil thus freed from the solvent is picked up by the pump 10 and forced through the pipe 11, into a heating coil 12. If a feed stock which is very rich in naphthenes is available, it may be introduced directly into the coil 12 by a pipe 13 and pump 14, without previous extraction and it will be understood that if two different feed stocks are available, both may be used in the same apparatus. If one is richer in aromatics, it need not be passed through the extraction; the other containing aromatics is preferably first extracted, as shown.

The naphthene rich fractions are heated in the coil 12 to a dehydrogenating temperature and then passed through a catalytic dehydrogenating reactor 12', but the process may be non-catalytic, if preferred, and the coil may be made sufficiently long so that the drum may be omitted. In any case the dehydrogenated products are cooled at 15 and the liquid is separated from hydrogen and other gases in separator 16. The gases are bled off by a pipe 17 and the dehydrogenated liquid is now subjected to solvent extraction in order to separate the aromatic fractions produced by dehydrogenation from the aliphatic fractions. The apparatus for this extraction may be of any suitable form, but preferably consists of a tower 18 similar to tower 3 described above. The solvent is shown entering at the top of the tower by pipe 19 and the raffinate, consisting mainly of paraffinic fractions, is taken off from the top of the tower by a pipe 20. This oil is separated from the solvent by distillation in the pipe heater 21 and tower still 22. The evaporated oil is condensed at 23 and is collected at 24. The extract is taken from the tower 18 by a pump 25 and is separated from the solvent by distillation in the coil 26 and tower 27 and is condensed and collected at 28. The solvent taken from towers 8, 22 and 27 by pipes 29, 30 and 31 respectively is returned to the solvent manifold 32 from which towers 2 and 18 are fed by pipes 4 and 19 respectively as stated above.

In the present process the oil may be a naphtha of finished boiling range suitable for gasoline, boiling for instance from 100° or 200° F. to 400° or 500° F. and may be taken from any one of the well known crudes which are rich in aromatic fractions. If there is a substantial amount of aromatics in the original crude, then it is desirable first to remove these by solvent extraction as shown on the drawing previously described. The raffinate from this extraction is rich in naphthenes and is dehydrogenated and then re-extracted so as to separate the aromatics produced by the dehydrogenation. The aromatic fraction so produced may then be combined as shown in the drawing previously described with the aromatic extract obtained from the original crude. The extraction process may be accomplished with any of a variety of different solvents suitable for this purpose. These are well known in the art. They include liquid sulfur dioxide or mixtures thereof with carbon dioxide, With such a solvent, the extraction is preferably carried out at a temperature below —20° F., where the solvents are very selective. Other suitable solvents are aniline, nitrobenzol, cresol, phenol, beta beta dichlor ethyl ether, furfural, triethylene glycol and the like. The extraction conditions for these various solvents differ, but the characteristics of each of the solvents are well known in the art at the present time and a detailed description of these conditions should not be required.

The dehydrogenation process is preferably catalytic and is conducted at low or moderate pressures, at temperatures preferably in the range of about 850° to 1050° F. depending on the particular catalyst used. Nickel and cobalt catalysts can be used at even lower temperatures but these poison rapidly with sulfur and base metal catalysts are preferred, especially those of the 6th group of the periodic table, chromium, molybdenum and tungsten, either as metals, oxides or sulfides, and suitably admixed with other metal oxides such as alumina, zinc oxide, thoria, magnesia, and the like.

While a catalytic process is preferred, it will be understood that dehydrogenation may be accomplished without the use of any catalyst. It is preferred to obtain dehydrogenation without decomposition of the carbon structures of the products or with at least a minimum of such portions of gaseous hydrocarbons. This catalytic reforming is capable of increasing the aromatic content of naphthenic naphthas to a considerably higher degree and with much less formation of hydrocarbon gas than is possible with previous reforming.

To illustrate the nature of the present operation, the following example may be considered:

A naphtha boiling from 115° to 400° F. was obtained from Lagunillas crude and was dehydrogenated by passing through a reactor at a rate of .79 volumes/volume of reactive space per hour, while at a temperature of 1045° F. The catalyst was a mixture of chromium oxide and zinc oxide. The boiling range of the product was substantially the same as of the feed, but a considerable volume of gas of low specific gravity was formed, very rich in free hydrogen. The gravity of the feed oil was 54.6° API and that of the product 52.6. The aniline point of the feed was 121° F. and that of the product 94° F. The dehydrogenated product obtained as above was distilled so as to get a fraction having a boiling range of 200 to 300° F., and this material was extracted once with 1.2 volumes of aniline at 71° F. About 21.5% of the fraction was removed by the extraction and this fraction was found to have a gravity of 43.8° API. The product was very aromatic and when used in concentration in 20% gasoline had a blending value of 76.

The present invention is not to be limited to any theory of the mechanism of the process, nor to any particular solvent or dehydrogenation method, but only to the following claim in which it is desired to claim all novelty inherent in the invention.

I claim:

A process for producing a very aromatic product from petroleum which comprises separating naphtha boiling between about 100 to 500° F. from a crude petroleum rich in naphthenic compounds, dehydrogenating the naphtha by passing it through a reactor at a temperature of approximately 1045° F. over a catalyst whereby a product of substantially the boiling range of the naphtha is produced containing aromatic compounds in the presence of non-aromatic compounds, distilling the dehydrogenated product to form a fraction boiling between about 200 and 300° F., extracting the fraction with a solvent adapted to separate the aromatic from the non-aromatic fractions and removing the solvent whereby a very aromatic product is obtained.

RAPHAEL ROSEN.